United States Patent [19]

Vaught et al.

[11] Patent Number: 4,490,728

[45] Date of Patent: Dec. 25, 1984

[54] THERMAL INK JET PRINTER

[75] Inventors: John L. Vaught, Palo Alto, Calif.; Frank L. Cloutier, Corvallis, Oreg.; David K. Donald, Redwood City, Calif.; John D. Meyer, Mt. View, Calif.; Christopher A. Tacklind, Palo Alto, Calif.; Howard H. Taub, San Jose, Calif.

[73] Assignee: Hewlett-Packard Company, Palo Alto, Calif.

[21] Appl. No.: 415,290

[22] Filed: Sep. 7, 1982

Related U.S. Application Data

[62] Division of Ser. No. 292,841, Aug. 14, 1981, abandoned.

[51] Int. Cl.[3] .......... G01D 15/18

[52] U.S. Cl. .......... 346/1.1; 346/140 R

[58] Field of Search .......... 346/140 R, 1.1

[56] References Cited

U.S. PATENT DOCUMENTS

| | | | |
|---|---|---|---|
| 2,556,550 | 6/1951 | Murray | 346/140 X |
| 3,747,120 | 7/1973 | Stemme | 346/140 X |
| 4,021,818 | 5/1977 | Van Vloten | 346/140 |
| 4,243,994 | 1/1981 | Kobayashi | 346/140 |
| 4,251,824 | 2/1981 | Hara | 346/140 |
| 4,296,421 | 10/1981 | Hara | 346/140 |
| 4,313,124 | 1/1982 | Hara | 346/140 |
| 4,313,684 | 2/1982 | Tazaki | 346/140 X |

*Primary Examiner*—Joseph W. Hartary

*Attorney, Agent, or Firm*—Douglas A. Kundrat; Joseph H. Smith

[57] ABSTRACT

A thermal ink jet printer is disclosed in which ink droplets are ejected from an orifice by the explosive formation of a vapor bubble within the ink supply due to the application of a two part electrical pulse to a resistor within the ink supply. The electrical pulse comprises a precurser pulse and a nucleation pulse; the precurser pulse preheats the ink in the vicinity of the resistor to a temperature below the boiling temperature of the ink so as to preheat the ink while avoiding vapor bubble nucleation within the ink supply and the subsequently occuring nucleation pulse very quickly heats the resistor to near the superheat limit of the ink.

4 Claims, 14 Drawing Figures

THERMAL INK JET PRINTER

This is a division of application Ser. No. 292,841, filed Aug. 14, 1981 now abandoned.

BACKGROUND OF THE INVENTION

Recent advances in data processing technology have spurred the development of a number of high speed devices for rendering permanent records of information. Alphanumeric non-impact printing mechanisms now include thermal, electrostatic, magnetic, electrophotographic, and ionic systems. Of particular import in these developing systems has been ink jet printing technology, because it offers a simple and direct method of electronically controlling the printed output and has the special advantage of being non-contact, high speed, and particularly well adapted to plain paper printing.

Generally, ink jet systems can be categorized into three basic types: continuous droplet ink jets in which droplets are generated continuously at a constant rate under constant ink pressure, electrostatically generated ink jets, and ink-on-demand jets (or impulse jets). This invention is concerned primarily with this latter system.

The primary approach in commercially available ink-on-demand systems has been to use piezoelectric crystals to propel ink from the orifice of a tube of narrow cross-section. A typical example of this approach is described in U.S. Pat. No. 3,832,579 entitled PULSED DROPLET EJECTING SYSTEM issued Aug. 27, 1974, by J. P. Arndt. Here a small cylindrical piezoelectric transducer is tightly bound to the outer surface of a cylindrical nozzle. Ink is brought to the nozzle by an ink hose connected between the broad end of the nozzle and an ink reservoir. As the transducer receives an electrical impulse, it generates a pressure wave which accelerates ink toward both ends of the nozzle. An ink droplet is formed when the ink pressure wave exceeds the surface tension of the meniscus at the orifice on the small end of the nozzle.

In these piezoelectric ink jet systems, a principal problem is associated with the relative disparity in size between the piezoelectric transducer and the ink jet orifice. The transducer is generally substantially larger than the orifice, thereby limiting either the minimum separation of the jets or the number of jets which can be used on a given print head. Furthermore, piezoelectric transducers are relatively expensive to produce and are not amenable to many of the modern semiconductor fabrication techniques.

Another type of ink-on-demand system is described in U.S. Pat. No. 3,174,042 entitled SUDDEN STEAM PRINTER issued June 28, 1962 by M. Naiman. This system utilizes plurality of ink containing tubes. Electrodes in the tubes contact the ink and upon a trigger signal an electric current is passed through the ink itself. This current flow heats the ink by virtue of a high $I^2R$ loss (where I is the current and R is the resistance of the ink), vaporizes a portion of the ink in the tubes, and causes ink and ink vapor to be expelled from the tubes.

The principal drawbacks of this steam-type system are the serious difficulties in controlling the ink spray, and the constraints on ink conductivity, since a highly conducting ink requires a large current flow to achieve the required vaporization, and therefore unduly restricts the types of ink which might be used.

Despite the fact that both of these systems have been known for many years, the technology of ink-on-demand ink-jet printing has yet to resolve the fundamental problems associated with each of these devices.

SUMMARY OF THE INVENTION

In accordance with the illustrated preferred embodiment of the present invention, a two-part electrical current pulse is applied to the thermal resistor of a thermal ink jet printer in order to cause ejection of a desired droplet. The current pulse comprises a first precurser pulse and a second nucleation pulse. The precurser pulse varies substantially as the square root of the inverse of time and causes the liquid in the vicinity of the resistor to be heated to a temperature which is below the boiling temperature of the liquid. Thus, the precurser pulse allows preheating of the liquid to occur without the necessity of a D.C. current and yet does not cause bubble nucleation and droplet ejection to occur. The nucleation pulse quickly causes the resistor temperature to exceed the boiling point of the liquid and to approach the superheat limit of the resistor so that a vapor bubble is generated in the liquid and a droplet is ejected.

DETAILED DESCRIPTION OF THE INVENTION

Figure 1:
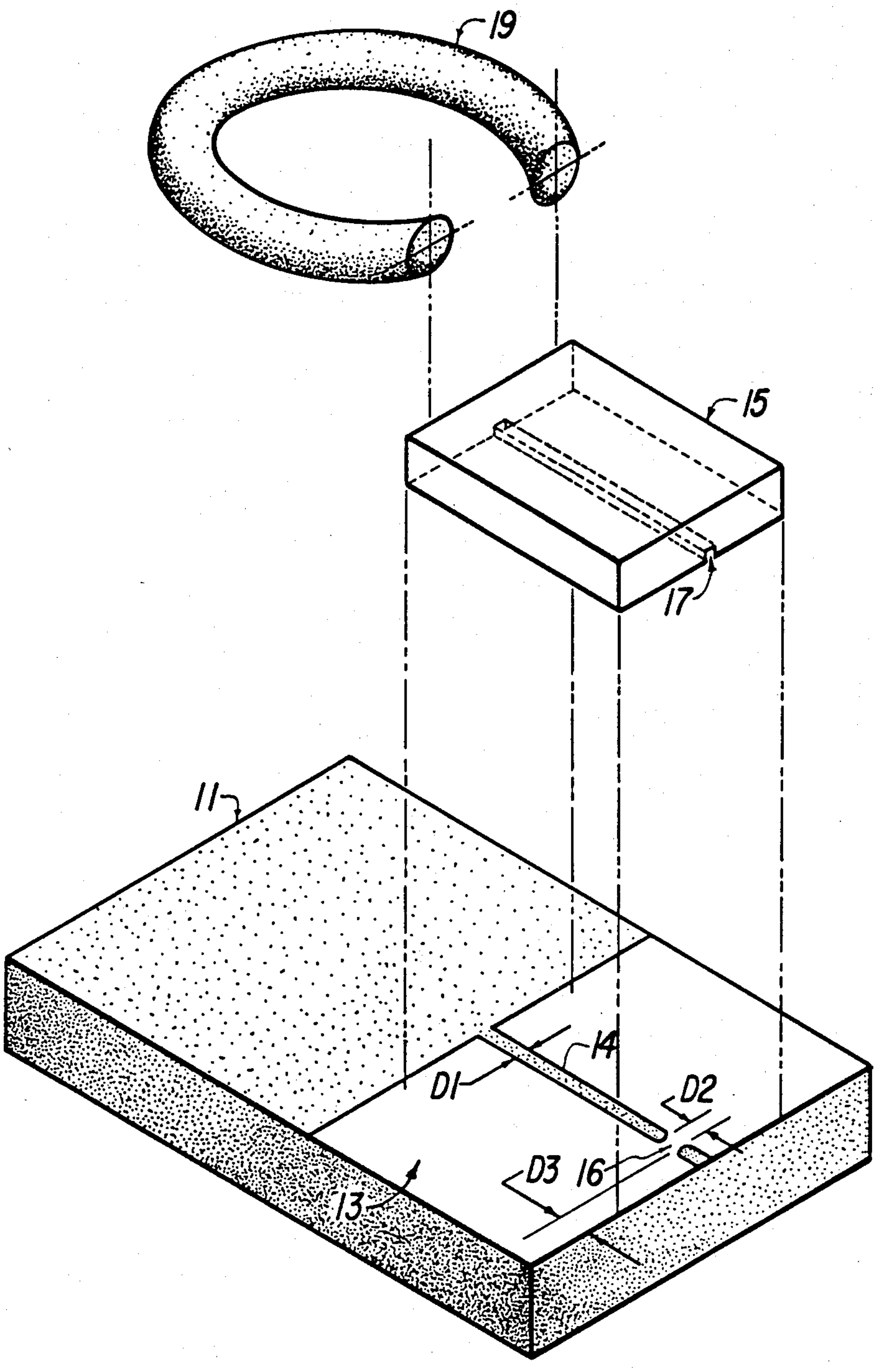
FIG. 1 is a disassembled view of a device according to the invention.
Figure 2:
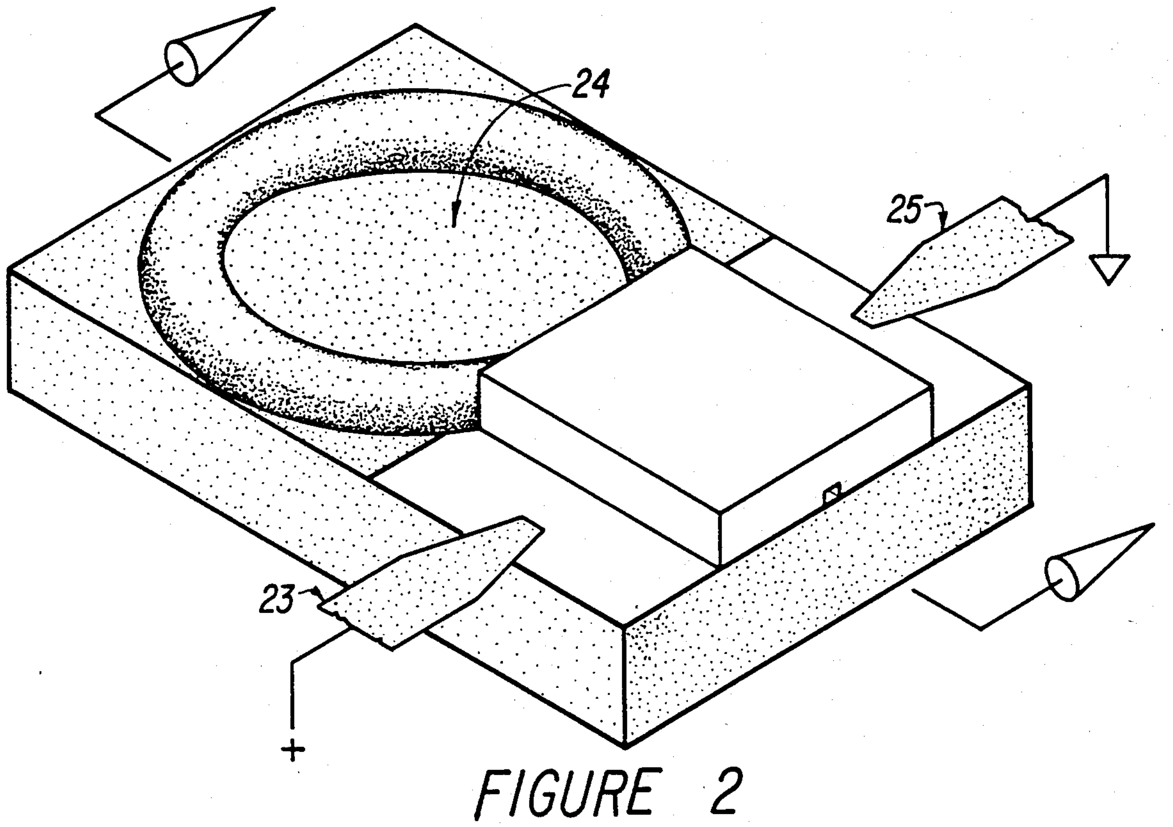
FIG. 2 is a view of the device of FIG. 1 in its assembled form.

Shown in FIG. 1 is a construction diagram of a thermal ink jet printer. FIG. 2 depicts the related to product after assembly. The basic construction is that of a substrate 11 typically sapphire, glass, or some inert composite material, such as coated metal or coated silicon, part of one surface of substrate 11 being covered with a thin film metallization layer 13. The thin film metallization has been configured to provide a narrow nonconducting strip 14 of width D1 (~0.003") and a conducting strip of width D2 (~0.003") to create a resistor 16 in metallization layer 13. A resistance of approximately 3 ohms is appropriate. In a typical configuration, resistor 16 is located at a distance D3 (nominally 0.006" but generally in the range 0.002" <D3<0.01") from the edge of substrate 11. Bonded to the top of thin film metallization 13 is a capillary block 15, typically glass, having a capillary channel 17 with an orifice on each end. Channel 17 is approximately 0.003" wide by 0.003" deep, corresponding in width to nonconducting strip 14 in metallization layer 13.

Figure 3:
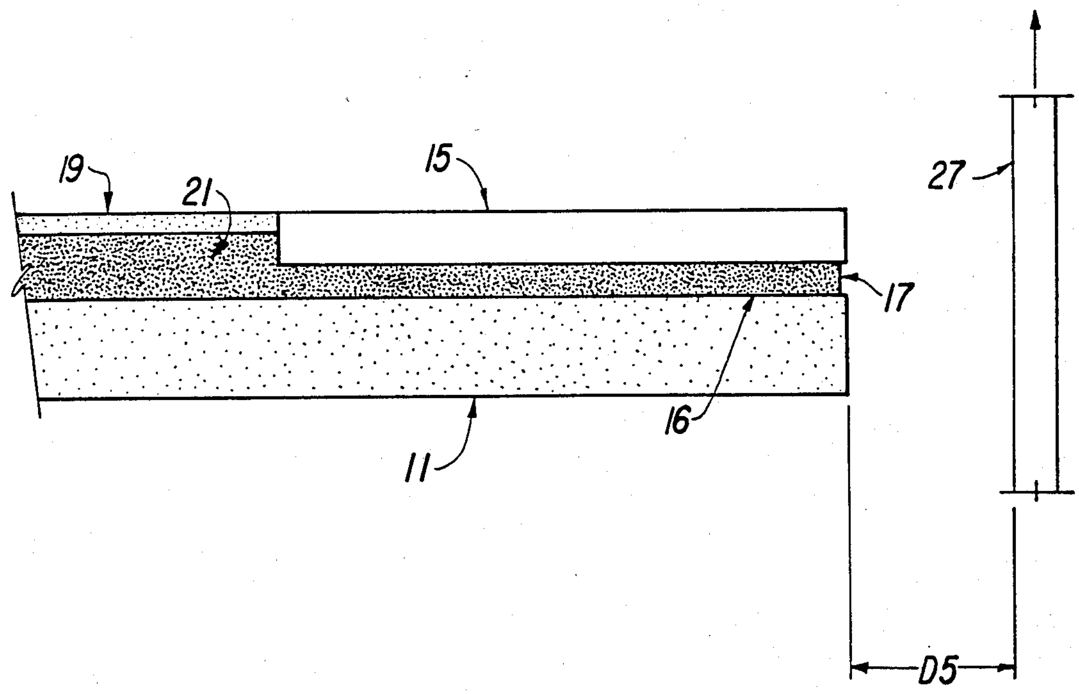
FIG. 3 is a cross-sectional view of the device shown in FIGS. 1 and 2.

Behind capillary block 15 and on top of substrate 11 is a reservior wall 19 for holding ink in a reservoir 24 in juxtaposition with capillary block 15. Channel 17 draws ink by capillary action from reservoir 24 to the vicinity of the orifice opposite the reservoir. As seen in FIG. 2, in its completed configuration the printer has two electrodes 23 and 25 which are attached to thin film metallization layer 13 for applying an electrical potential difference across resistor 16. FIG. 3, a cross-section of the thermal ink jet printer of FIGS. 1 and 2, shows the relative configurations of ink 21, capillary block 15, resistor 16 and a printing surface 27. In operation, the distance D5 between the printer orifice and the printing surface 27 is on the order of 0.03".

Figure 4:
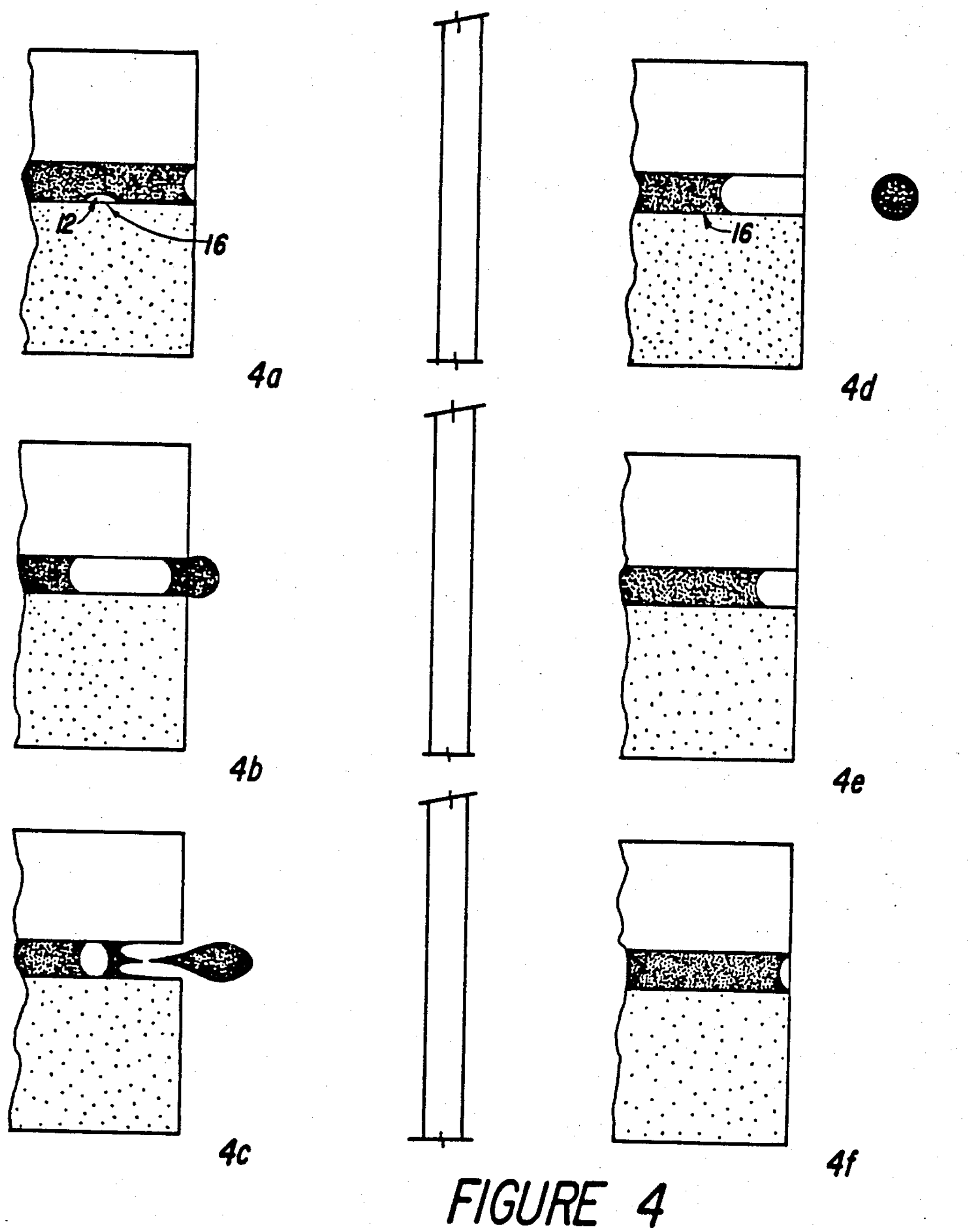
FIG. 4 depicts the time sequence of events involved in the production of an ink droplet.

FIG. 4 shows, in cross-section, a time sequence of events during one cycle of operation of the printer. As a voltage is applied to electrodes 23 and 25, the current through resistor 16 causes joule heating and superheats the ink, which, with proper control nucleates at a prescribed time, creating a bubble 12 over resistor 16 as shown in FIG. 4*a*. The bubble continues to expand very rapidly toward the orifice as shown in FIG. 4*b*, but its expansion is limited by the energy transferred to the ink. By maintaining careful control of the total energy, and the time distribution of energy fed into resistor 16, the bubble can be made to grow to a wide range of sizes. Care is taken, however, to ensure that the total energy absorbed by the ink is not so great as to expel vapor from the orifice. Instead, the bubble begins to collapse back onto resistor 16 as shown in FIG. 4*c*, while the forward momentum imparted to the ink from the bubble expansion acts to propel a droplet of ink from the orifice (it should be noted, however, that the droplet can be accompanied by one or more satellites depending on the ink used, the orifice geometry, and the applied voltage). After the drop has left the orifice, the bubble completely collapses back on or near its starting location as shown in FIG. 4*d*. The ink then begins to refill by capillary action (FIG. 4*e*), and the ink droplet subsequently lands on the printing surface. FIG. 4*f* shows the channel filled to its original position, ready for another cycle. Printing is then accomplished by successively applying a voltage to resistor 16 in an appropriate sequence while the orifice and the printing surface are moved transversely relative to each other to create a desired pattern.

Clearly, with the above device, the particular dimensions, including those of the substrate, capillary block, and capillary channel, can vary over a wide range depending on the desired mass, construction material and techniques, droplet size, capillary filling rate, ink viscosity, and surface tension. Also, in contradistinction to prior art devices, it is neither necessary that the conductivity of the ink be commensurate with a high $I^2R$ heat loss nor that the ink be electrically conductive at all.

An essential feature of the invention is that the impulse required to eject a droplet of ink from the orifice is caused by the expansion of a bubble, rather than by a pressure wave imparted by a piezoelectric crystal or other device. Careful control over the energy transfer from resistor 16 to the ink ensures that ink vapor does not escape from the orifice along with the droplet. Instead, the bubble collapses back onto itself eliminating any ink vapor spray. Furthermore, careful control of the time sequence of the energy transfer is exceedingly important.

Although a single square current pulse of about 1 amp with a duration of about 5 μsec through resistor 16 will accomplish the above result, such a straight-forward approach is not generally applicable to various jet configurations. In addition, problems arise when it is desired to produce a larger bubble, for example, to accomodate a larger orifice or to obtain a higher ejection velocity for the droplet. If the pulse is made longer to provide more energy to the ink, the statistical nature of bubble formation can cause substantial time jitter. On the other hand, if the pulse height is increased to ameliorate the problem of time jitter, the substantially higher current densities required can result in early burnout of the resistor due to electromigration.

Figure 5:
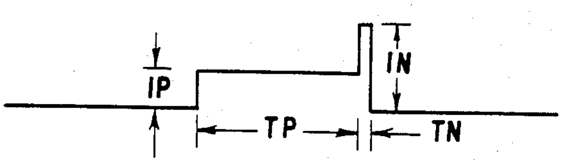
FIG. 5 shows a typical voltage profile which is involved with bubble formation.

Each of these problems can be substantially eliminated with the approach shown in FIG. 5. Here, no DC level is required, but a precurser pulse IP is used to preheat the ink in the vicinity of resistor 16 at a rate low enough to avoid bubble nucleation, i.e., the temperature of resistor 16 is kept below the boiling temperature of the ink. Precurser pulse IP is followed by a nucleation pulse IN which very quickly heats resistor 16 to near the superheat limit of the ink, i.e., the point at which a bubble spontaneously nucleates in the ink. The bubble nucleus so formed grows very rapidly, its mature size being determined by the volume of the ink heated by precurser pulse IP. During the growth phase of the bubble, the voltage across resistor 16 is generally reduced to zero, since the heat transfer to the ink is very ineffective during this time and sustaining the current can result in overheating of the resistor.

In a typical configuration, resistor 16 is about 3 ohms, the pulse height of precurser pulse IP is on the order of 0.3 amps with a pulse width TP of approximately 40 μsec, and the pulse height of nucleation pulse IN is on the order of 1 amp with a pulse width TN of approximately 5 μsec. Since these parameters can vary quite widely, however, it is more appropriate to view them in terms of the typical ranges which are encountered in operation: $0<R<100\omega$; $0<IP<3$ amps with $10<TP<100$ μsec; and $0.01<IN<5$ amps with $0<TN<10$ μsec.

Figure 6:
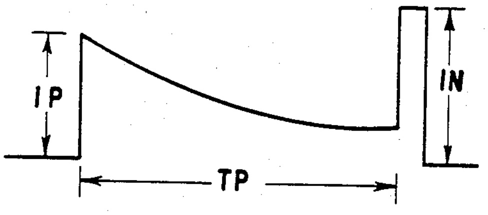
FIG. 6 shows a variation of the voltage profile involved in bubble formation.
Figure 7A:
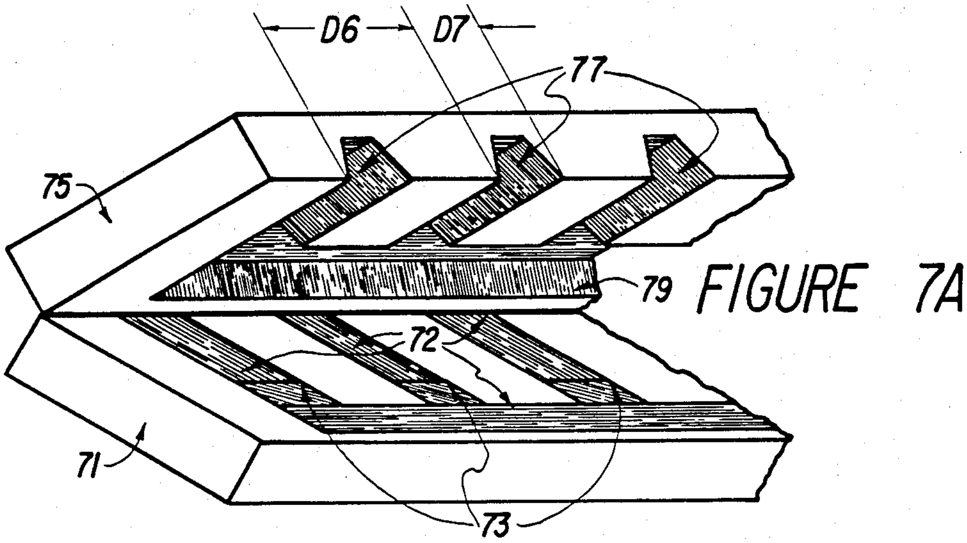
FIG. 7*a* is a disassembled view of a multiple-jet, edge-shooter print head.
Figure 7B:
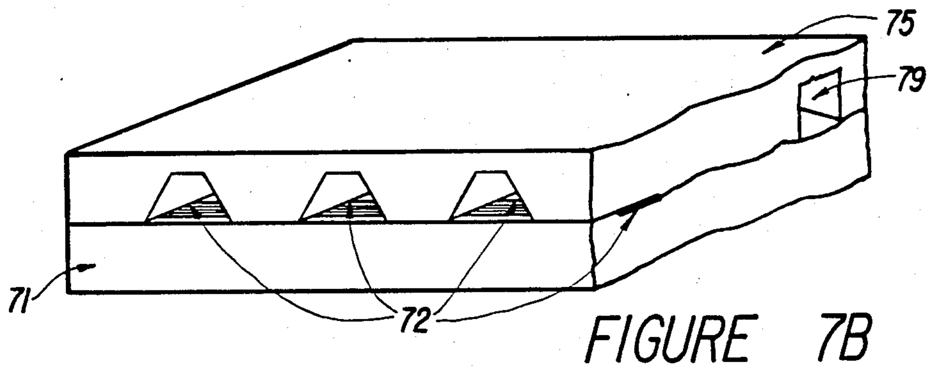
FIG. 7*b* shows the device of FIG. 7*a* in its assembled form.

Many other schemes for control of bubble formation are also available, e.g., pulse spacing modulation or pulse height modulation. Still another scheme is shown in FIG. 6. In this approach, the precurser pulse decreases in magnitude from its initial value of approximately 0.5 amps to a value of approximately 0.2 amps just before the nucleation pulse begins: The shape of the precurser pulse as a function of time varies as $1/\sqrt{t}$, which keeps the resistor at approximately a constant temperature, thereby optimizing the energy distribution in the ink before nucleation and decreasing the required nucleation pulse width while concurrently enhancing nucleation reproducability.

Shown in FIGS. *7a* and *7b* is an ink jet print head having more than one orifice, demonstrating the principles of the invention in a form more nearly commensurate with its commercial application. This so called "edge-shooter" device is made up of a substrate 71 and capillary block 75 having several ink capillary channels 77, located at the interface of the substrate and the capillary block. Typical materials used for substrate 71 are electrical insulators such as glass, ceramics, or coated metal or silicon, while the materials used for capillary block 75 are generally chosen for their ease of manufacture in regard to ink capillary channels 77. For example, capillary block 75 is typically made of molded glass, etched silicon, or etched glass. In its construction, substrate 71 and capillary block 75 can be sealed together in a variety of ways, for example, by epoxy, anodic bonding or with sealing glass. The distances D6 and D7 corresponding to the channel spacing and channel widths, respectively, are determined by the desired separation and size of the ink jets. Channel 79 is a reservoir channel to supply ink to the ink capillary channels 77 from a remote ink reservoir (not shown).

A plurality of resistors 73 is provided on substrate 71 with a resistor on the bottom of each capillary channel 77. Also provided is a corresponding number of electrical connections 72 for supplying electrical power to the various resistors 73. Both resistors 73 and electrical connections 72 can be formed using standard electronic fabrication techniques, such as physical or chemical vapor deposition. Typical materials for electrical connections 72 are chrome/gold (i.e., a thin under-layer of chromium for adhesion, with an over-layer of gold for conductivity), or aluminum. Suitable materials for the resistors 73 are typically platinum, titanium-tungsten, tantalum-aluminum, diffused silicon, or some amorphous alloys. Other materials would also clearly be appropriate for these various functions; however, some care must be taken to avoid materials which will be corroded or electroplated out with the various inks which might be used. For example, with water base inks, both aluminum and tantalum-aluminum exhibit these problems at the currents and resistivities typically used (i.e. with resistors in the range of 3 to 5 ohms and currents on the order of 1 amp). However, even these two materials can be used if a proper passivation layer is provided to insulate the electrical conductors and resistors from the ink.

Figure 8:
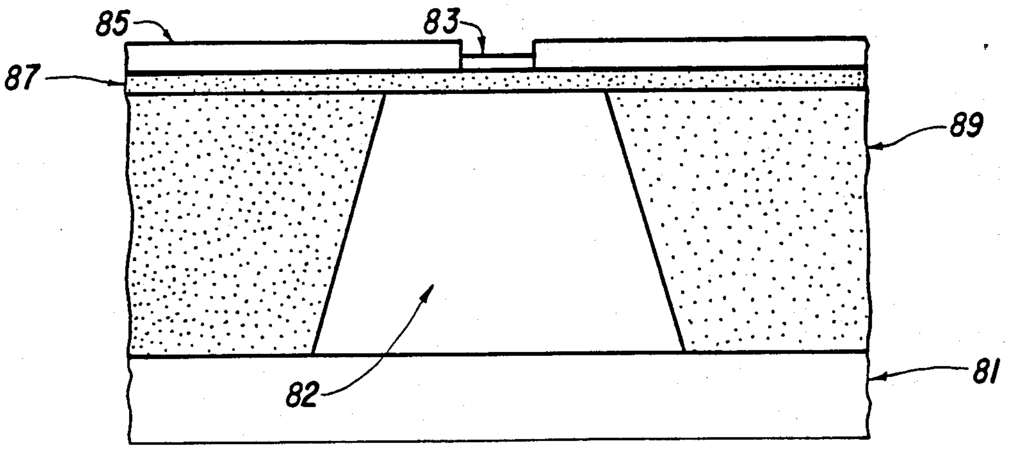
FIG. 8 is a cross-sectional view of another embodiment of an edge shooter print head.
Figure 9A:
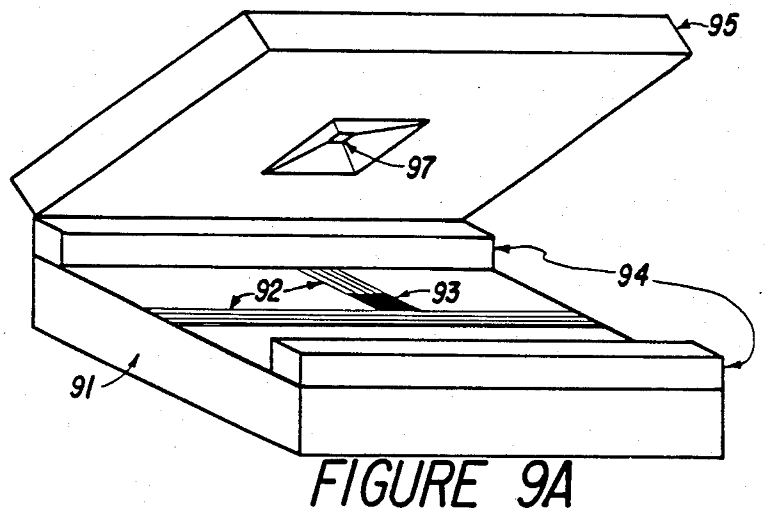
FIG. 9*a* is a diassembled view of the side-shooter print head.
Figure 9B:
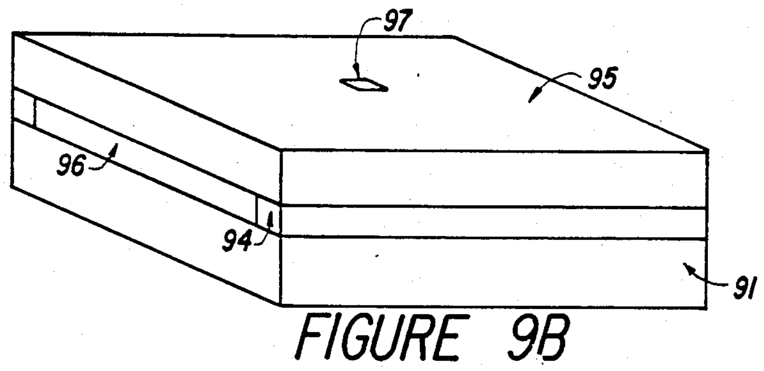
FIG. 9*b* is a view of the print head of FIG. 10*a* in its assembled form.

Shown in FIG. 8 is another configuration for an edge-shooter ink jet print head shown in cross-section. In this configuration, the thermal energy for creating a bubble in the ink is provided by a resistor 83. As in the previous embodiment, the resistor 83 is located at a small distance (~0.003") from the orifice of an ink channel 82 (note: the cross-section of FIG. 8 has been taken through resistor 83, so that the ink channel orifice is not shown). In this embodiment, there is provided a substrate 81, typically of glass, which is bonded to an etched silicon capillary block 89, which defines ink channel 82. Overlying capillary block 89 and ink channel 82 is a membrane 87, usually made of a heat tolerant, electrically nonconductive, thermally conductive, flexible material, such as silicon carbide, silicon dioxide, silicon nitride, or boron nitride. Resistor 83 is deposited on membrane 87 by standard techniques, and electrical power is provided to resistor 83 by a metallization layer 85 on each side of the resistor.

The advantage of this configuration relative to a non-flexible structure is that it improves device lifetime. Also, construction techniques are simplified since the structure consisting of substrate 81, capillary block 89, and membrane 87 can be essentially complete before the resistor and metallization layer are applied. Further, as in the previous embodiment, this particular structure is easily adapted to multiple channel devices and mass production techniques. Other variations of this concept of a resistor on a flexible membrane will occur to those skilled in the art. For example, by appropriate choice of materials, the flexible membrane as a separate structure could be eliminated entirely by providing a resistor which is itself flexible and self-supporting.

Shown in FIGS. *9a* and *9b* is yet another configuration for a thermal ink jet print head, a so called "side-shooter" device. In this configuration a substrate 91 is provided, typically constructed of glass or other inert, rigid, thermally insulating material. Electrical connections to a resistor 93 are provided by two condutors 92 in much the same manner as the construction shown in FIGS. *7a* and *7b*. Two plastic spacers 94 are used for maintaining the separation of substrate 91 from a top 95, thereby providing a capillary channel 96 for ink to flow to the resistor. Clearly, however, many other techniques are available for providing an appropriate spacing. For example, instead of plastic, the glass substrate itself could be etched to provide such a channel.

The top 95 in this embodiment is typically composed of silicon in order to provide a convenient crystalline structure for etching a tapered hole which acts as an orifice 97 for the ink jet. Orifice 97 is located directly opposite resistor 93, and can be fabricated according to the method described in U.S. Pat. No. 4,007,464 issued Feb. 8, 1977, entitled "Ink Jet Nozzle", by Bassous, et al. Orifice 97 is typically on the order of 0.004". It is important to note that many other materials could also be used for top 95 of the side-shooter ink jet; for example, a metal layer could be used with holes immediately opposite their respective resistors, or even a plastic top could be used.

Figure 10B:
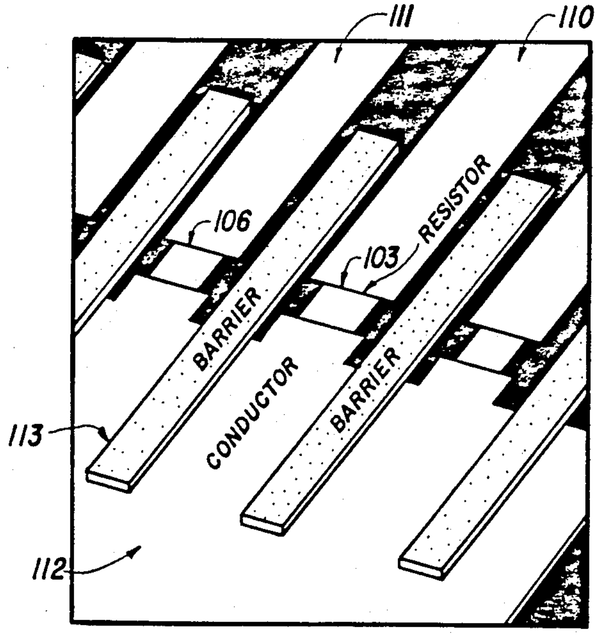
FIG. 10*b* is an oblique view of the top of the substrate of the device shown in FIG. 10*a*.
Figure 10A:
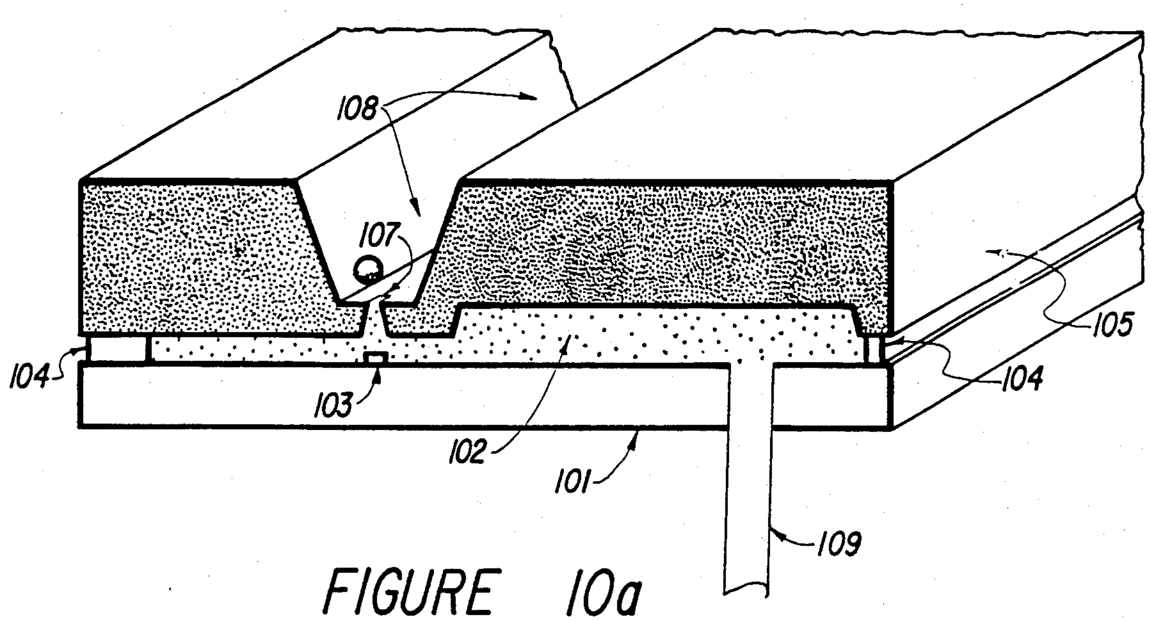
FIG. 10*a* is an oblique view of a multiple-jet, side-shooter print head.

Shown in FIG. 10*a* is a typical configuration which might be used in a commerical realization of a side-shooter system having multiple jets. In this embodiment substrate 101 is typically glass on which two glass spacers 104 are placed for holding ink 102. A silicon top 105 is provided having a series of etched tapered holes as represented by hole 107. Each hole is recessed in a trough 108 so that a thicker top can be used to provide better structural stability to the device in order to support a larger print head system for multiple jets. Element 109 is a fill tube which is connected to a remote reservoir (not shown) in order that a continuous supply of ink can be provided to the resistor/orifice system.

FIG. 10*b* is a view of a portion of substrate 101 from the top. Here, a second resistor 106 is shown which also lies along trough 108 of FIG. 10*a*. Electrical power is supplied to resistors 103 and 106 by two independent electrical connections 110 and 111 respectively, and by a common ground 112. In order to prevent ink from being ejected from orifice 107 when resistor 106 fires, a barrier 113 is provided between resistors 106 and 103. In the above configuration, barrier 113 is typically constructed of glass, silicon, photopolymer, glass bead-filled epoxy, or electroless metal deposited onto the substrate or the inside surface of the top. Additional methods for providing barriers become available if a metal top is used. For example, barriers could be metal plated directly onto the inside surface of the metal top.

Figure 11:
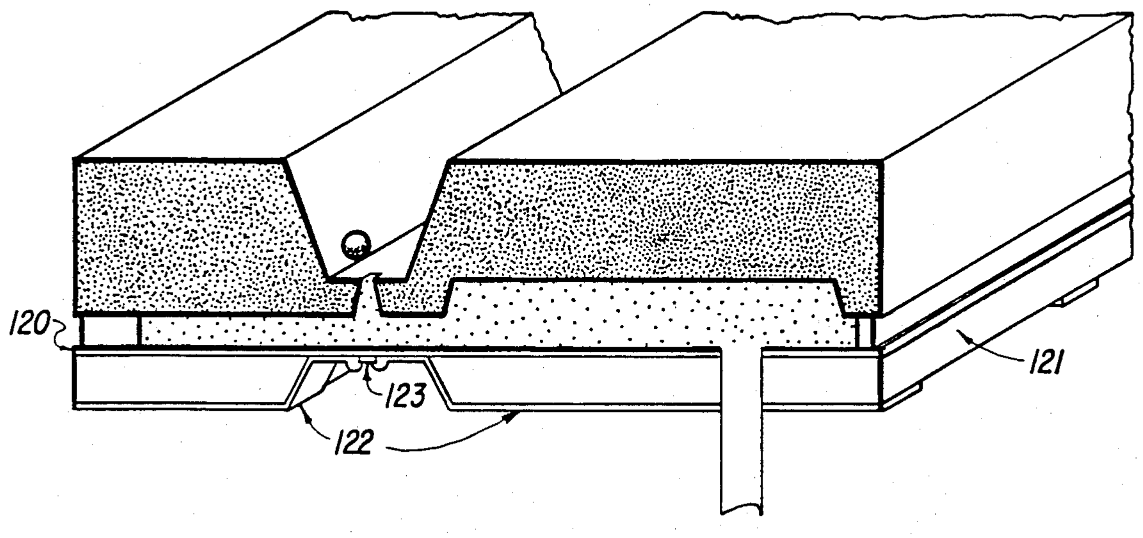
FIG. 11 is an oblique view of another multiple-jet, side-shooter print head.

Another embodiment of the side-shooter print head is shown in FIG. 11, which incorporates the membrane and external resistor of FIG. 8. The details of this embodiment are identical to those of FIG. 10, except that the substrate has been replaced by a membrane 120, again typically of silicon carbide, silicon dioxide, silicon nitride, or boron nitride, and a substrate 121. Located on membrane 120 and external to the ink is a resistor 123. As in the previous examples, electrical connection to resistor 123 is provided by two conductors 122. Substrate 121 is provided for structural stability and is usually etched glass, or etched silicon, and has a recess near resistor 123 to permit flexing of membrane 120.

Clearly, there are many other embodiments which could be configured with various kinds of materials and with many different geometries depending on the particular nature and needs of the application. For example, within certain limits and depending on the inks which are used, larger orifices lead to larger drop size and smaller orifices lead to smaller drop size. Similarly, the maximum frequency for the ejection of ink drops depends on the thermal relaxation time of the substrate and the refill time. Electrical characteristics of the ink can also result in different geometric configurations. For instance, should current flow through the ink become a problem because of highly conductive inks, passivation layers can be placed over the resistors themselves and over the conductors in order to avoid conduction.

What is claimed is:

1. A method of ejecting a droplet of liquid from an orifice in a liquid-containing capillary, comprising the steps of:

heating a portion of said liquid to a temperature which is below the boiling point of the liquid by passing an electrical precurser current pulse, which varies substantially as the square root of the inverse of time, through a resistor which is in thermal contact with said portion; and quickly heating said portion, by passing a subsequent electrical nucleation current pulse through the resistor, to a temperature above the boiling point of the liquid and near the superheat limit of the liquid to cause formation of a vapor bubble in said liquid-containing capillary, said vapor bubble causing a droplet of liquid to be ejected from said orifice.

2. A method as in claim 1 wherein said liquid comprises ink.

3. A method as in claim 1, wherein said precurser and nucleation current pulses are insufficient to cause vaporized liquid to escape from said orifice.

4. A method as in claim 3, wherein said liquid comprises ink.

* * * * *

UNITED STATES PATENT AND TRADEMARK OFFICE

CERTIFICATE OF CORRECTION

PATENT NO. : 4,490,728

DATED : December 25, 1984

INVENTOR(S) : Vaught et al.

It is certified that error appears in the above—identified patent and that said Letters Patent is hereby corrected as shown below:

Column 2, line 58, delete the word "to".

Column 4, line 45, "$0<R<100\omega$;" should read -- $0<R<100\Omega$; --.

Signed and Sealed this

*Thirtieth* Day of *July 1985*

[SEAL]

*Attest:*

DONALD J. QUIGG

*Attesting Officer* *Acting Commissioner of Patents and Trademarks*